United States Patent
Yao et al.

(10) Patent No.: US 9,887,902 B2
(45) Date of Patent: Feb. 6, 2018

(54) TRAFFIC SWITCHING METHOD, DEVICE, AND SYSTEM

(71) Applicant: Huawei Technologies Co., Ltd., Shenzhen (CN)

(72) Inventors: Ziyang Yao, Nanjing (CN); Feng Dong, Nanjing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 49 days.

(21) Appl. No.: 15/216,479

(22) Filed: Jul. 21, 2016

(65) Prior Publication Data
US 2017/0026273 A1    Jan. 26, 2017

(30) Foreign Application Priority Data
Jul. 22, 2015    (CN) .......................... 2015 1 0433703

(51) Int. Cl.
*H04L 12/751*    (2013.01)
*H04L 12/707*    (2013.01)
(Continued)

(52) U.S. Cl.
CPC ............. *H04L 45/02* (2013.01); *H04L 45/24* (2013.01); *H04L 45/745* (2013.01);
(Continued)

(58) Field of Classification Search
None
See application file for complete search history.

(56) References Cited

U.S. PATENT DOCUMENTS

| 6,721,800 B1* | 4/2004 | Basso | H04L 45/00 709/239 |
|---|---|---|---|
| 7,190,696 B1* | 3/2007 | Manur | H04L 45/00 370/392 |

(Continued)

FOREIGN PATENT DOCUMENTS

| EP | 2849395 A1 | 3/2015 |
|---|---|---|
| JP | 2001156821 A | 10/2015 |

(Continued)

OTHER PUBLICATIONS

Foreign Communication From a Counterpart Application, European Application No. 16180265.7, Extended European Search Report dated Dec. 5, 2016, 5 pages.

(Continued)

*Primary Examiner* — Hong Cho
(74) *Attorney, Agent, or Firm* — Conley Rose, P.C.

(57) ABSTRACT

A traffic switching method, a device, and a system where, a software-defined networking (SDN) controller acquires a first state of a target gateway, where the target gateway belongs to an SDN gateway group, the SDN gateway group is used to forward traffic that is transmitted between a first network node and a second network node, and multiple forwarding paths on which multiple gateways in the SDN gateway group are located form multiple equal-cost paths between the first network node and the second network node. The SDN controller sends an Address Resolution Protocol (ARP) entry to the target gateway according to the first state, and changes, of the multiple equal-cost paths, a metric value of a forwarding path on which the target gateway is located from an original value to a first value, where the first value is greater than the original value.

15 Claims, 7 Drawing Sheets

---

An SDN controller acquires a first state of a target gateway, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each gateway, the first network node, and the second network node form a forwarding path, and multiple forwarding paths on which the multiple gateways are located form multiple equal-cost paths between the first network node and the second network node    S101

The SDN controller sends an ARP entry to the target gateway according to the first state, and changes, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value    S103

(51) Int. Cl.
*H04L 12/741* (2013.01)
*H04L 29/12* (2006.01)
*H04L 12/721* (2013.01)
*H04L 12/717* (2013.01)

(52) U.S. Cl.
CPC ........ *H04L 61/103* (2013.01); *H04L 61/6022* (2013.01); *H04L 45/123* (2013.01); *H04L 45/42* (2013.01); *H04L 45/74* (2013.01)

(56) References Cited

U.S. PATENT DOCUMENTS

| 8,018,852 B2* | 9/2011 | Olakangil | H04L 45/00 370/229 |
|---|---|---|---|
| 9,584,397 B2* | 2/2017 | Ghanwani | H04L 41/12 |
| 2015/0281067 A1 | 10/2015 | Wu | |
| 2015/0326526 A1 | 11/2015 | Zeng et al. | |

FOREIGN PATENT DOCUMENTS

| WO | 2014142973 A1 | 9/2014 |
|---|---|---|
| WO | 2015100953 A1 | 7/2015 |

OTHER PUBLICATIONS

Machine Translation and Abstract of Japanese Publication No. JP2001156821, Jun. 8, 2001, 32 pages.
Foreign Communication From A Counterpart Application, Japanese Application No. 2016-143163, Japanese Office Action dated Oct. 3, 2017, 3 pages.
Foreign Communication From A Counterpart Application, Japanese Application No. 2016-143163, English Translation of Japanese Office Action dated Oct. 3, 2017, 3 pages.

* cited by examiner

TRAFFIC SWITCHING METHOD, DEVICE, AND SYSTEM

CROSS-REFERENCE TO RELATED APPLICATION

This application claims priority to Chinese Patent Application No. 201510433703.8, filed on Jul. 22, 2015, which is hereby incorporated by reference in its entirety.

TECHNICAL FIELD

The present disclosure relates to the field of network technologies, and in particular, to a traffic switching method, a device, and a system.

BACKGROUND

Network overlay is a mainstream architectural pattern of software-defined networking (SDN), and can implement decoupling between a network service and an underlying physical network device, thereby creating a flexible virtual network.

To improve reliability of packet transmission, network nodes in an overlay architecture perform packet forwarding using a multi-active gateway (which comprises multiple gateways sharing a same network address), and forwarding paths on which the gateways of the multi-active gateway are located form an equal-cost multi-path (ECMP) between the network nodes.

When a gateway of the multi-active gateway is restarted due to a fault, to ensure consistency between Address Resolution Protocol (ARP) entries, an SDN controller needs to send ARP entries on the SDN controller in batches to the faulty gateway. However, in the time-consuming ARP entry sending process, a network node in a network still selects a forwarding path on which the faulty gateway is located to forward traffic. In this case, because updating of ARP entries on the faulty gateway has not been completed, data forwarded to the faulty gateway may be lost.

In the prior art, a solution to this problem includes setting the faulty gateway not to work before the ARP entry sending is finished. However, other service functions of the faulty gateway are severely affected.

SUMMARY

Embodiments of the present disclosure provide a traffic switching method, a device, and a system, which resolve a problem that when sending ARP entries to a faulty gateway is not finished, routing a packet to the gateway through an ECMP causes data loss. In addition, in the ARP entry sending process, other service functions of the gateway are not affected.

According to a first aspect, a traffic switching method is provided, including acquiring, by an SDN controller, a first state of a target gateway, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each of the multiple gateways, the first network node, and the second network node form a forwarding path, and multiple forwarding paths on which the multiple gateways are located form multiple equal-cost paths between the first network node and the second network node, and sending, by the SDN controller, an ARP entry to the target gateway according to the first state, and changing, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

According to a second aspect, a network device is provided. The network device includes a memory, a transceiver and a processor, where the memory is configured to store a program code. The processor is configured to call the program code to implement a traffic switching method, where the method comprises acquiring a first state of a target gateway using the transceiver, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each of the multiple gateways, the first network node, and the second network node form a forwarding path, and multiple forwarding paths on which the multiple gateways are located form multiple equal-cost paths between the first network node and the second network node, sending an ARP entry to the target gateway according to the first state using the transceiver, and changing, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

According to a third aspect, a network communications system is provided, including an SDN controller, a target gateway, an SDN gateway group, a first network node, and a second network node, where the SDN controller is configured to acquire a first state of the target gateway, where the first state indicates that an ARP entry on the target gateway needs to be updated, the target gateway belongs to the SDN gateway group, the SDN gateway group is used to forward traffic that is transmitted between the first network node and the second network node, and the SDN gateway group includes multiple gateways, where each of the multiple gateways, the first network node, and the second network node form a forwarding path, and multiple forwarding paths on which the multiple gateways are located form multiple equal-cost paths between the first network node and the second network node, and the SDN controller is further configured to send an ARP entry to the target gateway according to the first state, and change, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

In the embodiments of the present disclosure, a target gateway belongs to an SDN gateway group, and forwarding paths on which gateways in the SDN gateway group are located form an ECMP between a first network node and a second network node. After acquiring a first state of the target gateway, an SDN controller sends an ARP entry to the target gateway, and in the process of sending the ARP entry, changes a metric value of a forwarding path on which the target gateway is located from an original value to a first value, where the first value is greater than the original value. In the embodiments of the present disclosure, a metric value of a forwarding path on which a faulty gateway is located is increased to lower a route priority of the forwarding path, thereby preventing traffic from being routed to the faulty gateway through an ECMP in order to avoid data loss. In addition, in the ARP entry sending process, other service functions of the faulty gateway are not affected.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The embodiments of the present disclosure involve multiple terms. For meanings of the terms involved in the embodiments, refer to the request for comments (RFC) 826 (ARP) and RFC2992 (ECMP).

Embodiments of the present disclosure provide a traffic switching method, a device, and a system, where a metric value of a forwarding path on which a faulty gateway is located is increased to lower a route priority of the forwarding path, thereby preventing traffic from being routed to the faulty gateway through an ECMP in order to avoid data loss. In addition, in the ARP entry sending process, other service functions of the faulty gateway are not affected.

To make the embodiments of the present disclosure more comprehensible, the following uses a virtual extensible local area network (VXLAN), where VXLAN is a mainstream overlay network technology at present, as an example to describe an application scenario of the embodiments of the present disclosure.

Figure 1:
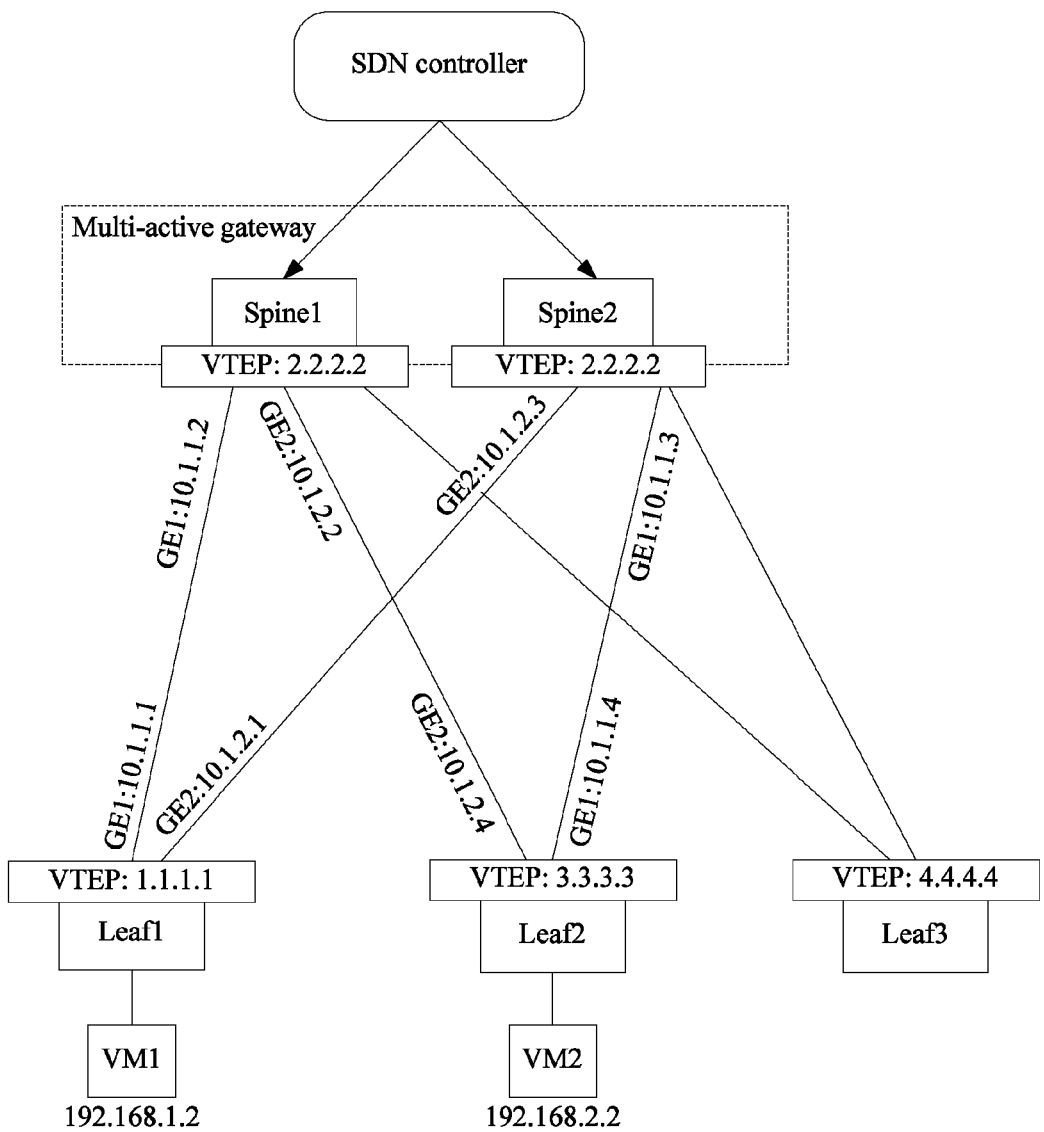
FIG. 1 is a schematic diagram of an application scenario according to an embodiment of the present disclosure.

Referring to FIG. 1, FIG. 1 is a schematic diagram of an application scenario according to an embodiment of the present disclosure. In the application scenario shown in FIG. 1, VXLAN tunnel end points (VTEP) of a switch Spine1 and a switch Spine2 share a same network address (2.2.2.2) such that Spine1 and Spine2 form a multi-active gateway. In the multi-active gateway, ARP entries on each gateway need to remain the same as ARP entries on another gateway.

To increase traffic load of a network and improve reliability and security of transmission, forwarding paths on which gateways of the multi-active gateway are located form an ECMP between VTEP nodes (for example, a VTEP of Leaf1 and a VTEP of Leaf2) in a VXLAN network.

In a specific implementation, the ECMP is represented using a routing table on a network device. For example, a routing table of a switch Leaf1 in FIG. 1 is shown in Table 1:

TABLE 1

| Destination address | Next hop | Metric value | Outbound interface |
| --- | --- | --- | --- |
| 2.2.2.2 | 10.1.1.2 | 0 | GE1 |
| 2.2.2.2 | 10.1.2.3 | 0 | GE2 |
| 3.3.3.3 | 10.1.1.2 | 0 | GE1 |
| 3.3.3.3 | 10.1.2.3 | 0 | GE2 |

A lower metric value indicates a higher route priority.

The foregoing Table 1 indicates that there are two equal-cost paths with a high route priority between VTEP:1.1.1.1 and VTEP:3.3.3.3, namely, a forwarding path on which Spine1 (next hop: 10.1.1.2) is located and a forwarding path on which Spine2 (next hop: 10.1.2.3) is located, and there are also two equal-cost paths between VTEP:1.1.1.1 and VTEP:2.2.2.2, namely, a forwarding path on which Spine1 is located and a forwarding path on which Spine2 is located.

When traffic is transmitted through an ECMP, a network device (for example, Leaf1) usually distributes traffic load on each equal-cost path using an ECMP traffic distribution algorithm (for example, a hash algorithm) in order to reduce network congestion and fully utilize link bandwidth.

In an actual application, in the application scenario shown in FIG. 1, the VTEP is used for encapsulation and decapsulation of VXLAN packets, and the multi-active gateway not only has the function of the VTEP, but also is responsible for forwarding a packet according to an ARP entry. However, when a gateway of the multi-active gateway is faulty (which results in loss of an ARP entry on the gateway), a packet that is routed to the faulty gateway using the ECMP traffic distribution algorithm is likely to be lost.

In the prior art, a solution for resolving the packet loss problem includes setting the faulty gateway not to work before a process of sending an ARP entry to a faulty gateway by an SDN controller is completed. However, other service functions of the faulty gateway are severely affected.

In view of the disadvantages in the application scenario shown in FIG. 1, the embodiments of the present disclosure disclose a traffic switching method, a device, and a system, where a metric value of a forwarding path on which a faulty gateway is located is increased to lower a route priority of the forwarding path, thereby preventing traffic from being routed to the faulty gateway through an ECMP in order to avoid data loss. In addition, in the ARP entry sending process, other service functions of the faulty gateway are not affected. Detailed descriptions are separately provided below.

Figure 2:
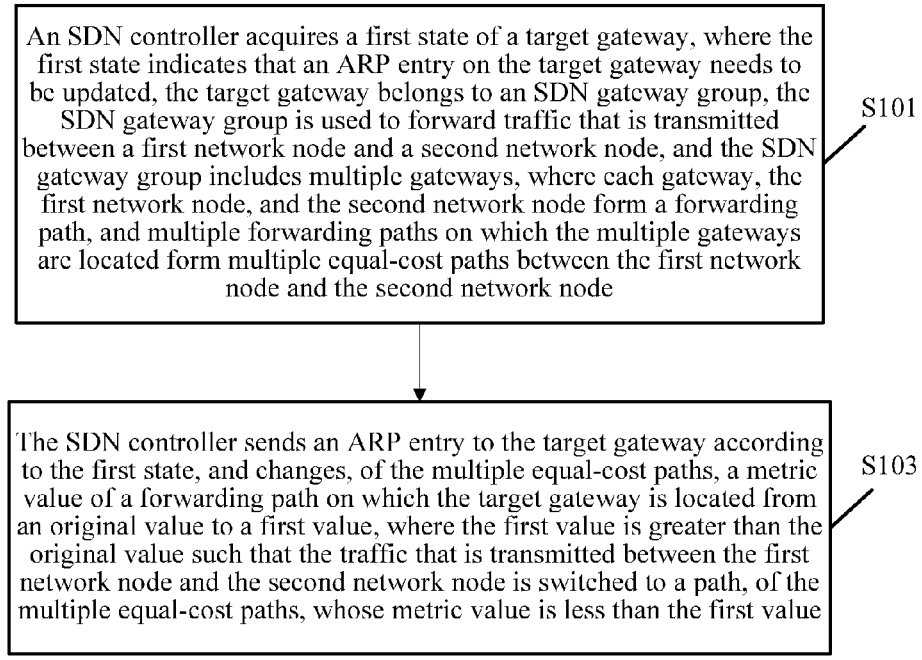
FIG. 2 is a flowchart of a first embodiment of a traffic switching method according to an embodiment of the present disclosure.

Referring to FIG. 2, FIG. 2 is a flowchart of a first embodiment of a traffic switching method according to an embodiment of the present disclosure. As shown in FIG. 2, the method includes the following steps.

Step S101: An SDN controller acquires a first state of a target gateway, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each gateway, the first network node, and the second network node form a forwarding path, and the multiple forwarding paths on which the multiple gateways are located form multiple equal-cost paths between the first network node and the second network node.

In this embodiment, the SDN gateway group may be equivalent to the multi-active gateway in FIG. 1. The first network node and the second network node may be any two network nodes of neighboring network nodes of the multi-active gateway.

In this embodiment, the first state may be a state in which the target gateway is restarted due to a fault. Generally, restart of a network device results in loss of an ARP entry stored thereon or results in that a stored ARP entry is deemed as untrusted. In this case, the network device needs to update the ARP entry. Therefore, the first state can be used to indicate that an ARP entry on the target gateway needs to be updated. It should be noted that the first state may also be another abnormal state leading to that an ARP entry on the target gateway needs to be updated, which is not limited herein.

For definitions of the ARP entry and other ARP-related terms, refer to RFC826, and details are not described herein again.

In a specific implementation, the first state may be sent by the target gateway to the SDN controller. Alternatively, the first state may be obtained by the SDN controller by active querying (polling). A manner of acquiring the first state is not limited in this embodiment.

It should be noted that a quantity of gateways of the multi-active gateway may be determined by a network configuration, which is not limited herein.

Step S103: The SDN controller sends an ARP entry to the target gateway according to the first state, and changes, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

In this embodiment, the network device may maintain a routing metric parameter of a preset routing protocol, and publish the routing metric parameter to a neighboring node of the network device using the preset routing protocol such that the neighboring node of the network device sets, in a local routing table, a metric value of a path on which the network device is located to a value of the routing metric parameter.

In a specific implementation, in the process of sending an ARP entry to the target gateway, the SDN controller may set a routing metric parameter of a preset routing protocol on the target gateway to the first value using a preset network configuration protocol, such as the extensible markup language (XML)-based network configuration protocol (NETCONF) or the simple network management protocol (SNMP) in order to trigger the target gateway to publish a correspondence between the routing metric parameter and the first value to the first network node and the second network node using the preset routing protocol such that the first network node and the second network node set, in their respective routing tables, the metric value of the forwarding path on which the target gateway is located to the first value according to the correspondence between the routing metric parameter and the first value.

In this embodiment, the preset routing protocol may be the border gateway protocol (BGP), or may be the open shortest path first (OSPF) protocol, or may be another routing protocol, which is not limited herein.

Figure 3:
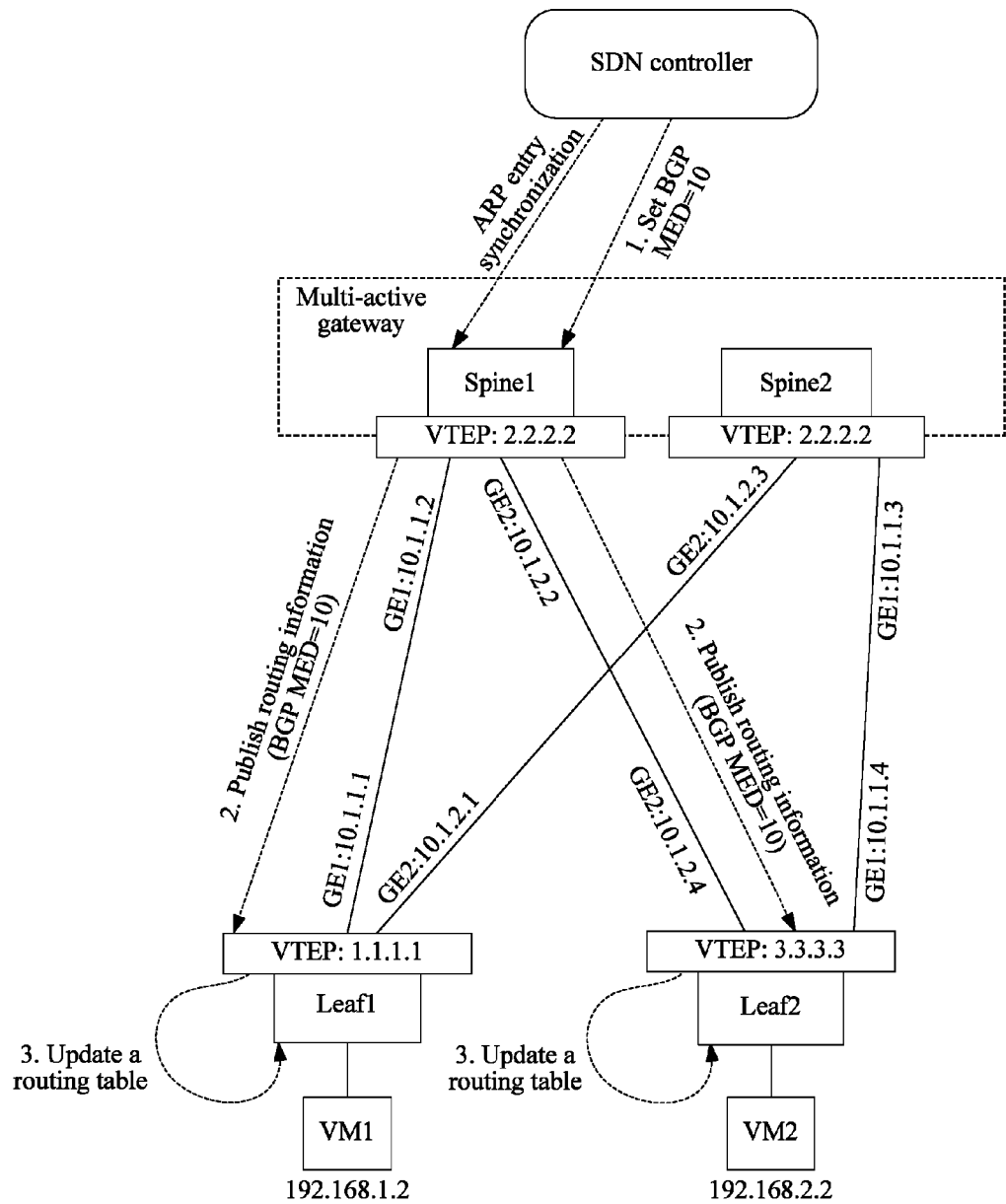
FIG. 3 is a schematic diagram of increasing a metric value of a forwarding path on which a target gateway is located according to an embodiment of the present disclosure.

The following uses the BGP as an example to provide a description with reference to FIG. 3. In this embodiment of the present disclosure, the metric value of the forwarding path on which the target gateway is located may be increased by performing the following steps.

Step 1: An SDN controller sets a value of a routing metric parameter (for example, BGP MED) of the BGP on a target gateway (Spine1) to the first value. For example, the first value may be a maximum metric value of 10.

Step 2: The target gateway publishes a correspondence between the routing metric parameter and the first value (that is, a correspondence between the MED and 10, for example, MED=10 or MED:10) to a first network node (a VTEP of Leaf1) and a second network node (a VTEP of Leaf2) using the BGP.

Step 3: The first network node and the second network node set, in their respective routing tables, a metric value of a forwarding path on which the target gateway is located to the first value according to the correspondence between the routing metric parameter and the first value.

After the foregoing process, a routing table on Leaf1 is shown in Table 2:

TABLE 2

| Destination address | Next hop | Metric value | Outbound interface |
|---|---|---|---|
| 2.2.2.2 | 10.1.1.2 | 10 | GE1 |
| 2.2.2.2 | 10.1.2.3 | 0 | GE2 |
| 3.3.3.3 | 10.1.1.2 | 10 | GE1 |
| 3.3.3.3 | 10.1.2.3 | 0 | GE2 |

According to a routing protocol, during traffic transmission, traffic is preferentially transmitted through a path with a high route priority. It may be understood that Leaf1 may preferentially choose to send traffic to the VTEP of Leaf2 using Spine2 (next hop: 10.1.2.3) according to the routing table shown in Table 2, thereby avoiding data loss that is caused when Leaf1 performs traffic transmission using Spine1 (next hop: 10.1.1.2).

Optionally, the SDN controller may encapsulate ARP entries into OPENFLOW packets, and then deliver the OPENFLOW packets in batches to the target gateway.

In addition, because a network status is dynamic, for example, a network device is added or an Internet Protocol (IP) address of a communications port on a network device is changed, an ARP entry on the SDN controller also needs to be updated dynamically, and the updated ARP entry needs to be sent to the multi-active gateway. In a specific implementation, after the VXLAN network shown in FIG. 1 is established, the SDN controller may update an ARP entry on the multi-active gateway using a centralized ARP processing process.

The following describes the centralized ARP processing process with reference to FIG. 1 (assuming that a VTEP of Leaf3 is a newly added network node):

1. An SDN controller receives an ARP request sent by a first network node (the VTEP of Leaf3), where the ARP request is used to request to acquire a media access control (MAC) address of a second network node (the VTEP of Leaf1).

2. The SDN controller performs ARP learning according to an IP address and a MAC address of the first network node (the VTEP of Leaf3) that are carried in the ARP request, and searches for the MAC address of the second network node according to an IP address of the second network node that is carried in the ARP request.

3. The SDN controller delivers a learned ARP entry to the multi-active gateway to update an ARP entry on the multi-active gateway, and sends an ARP response to the first network node according to the MAC address of the second network node, where the ARP response carries the MAC address of the second network node.

It may be understood that the ARP entry learned by the SDN controller through the foregoing process includes the IP address and the MAC address of the VTEP of Leaf3. The SDN controller delivers the learned ARP entry to the multi-active gateway such that the ARP entry on the multi-active gateway can be updated. In this way, the ARP entry on the multi-active gateway is the same as the ARP entry on the SDN controller.

During implementation of this embodiment of the present disclosure, after the SDN controller acquires the first state (an ARP entry on the target gateway needs to be updated) of the target gateway in step S101, the SDN controller may increase the metric value of the forwarding path on which the target gateway is located and send an ARP entry to the target gateway in step S103, thereby avoiding data loss that is caused when traffic is routed to the target gateway through an ECMP in an ARP entry sending process.

Figure 4:
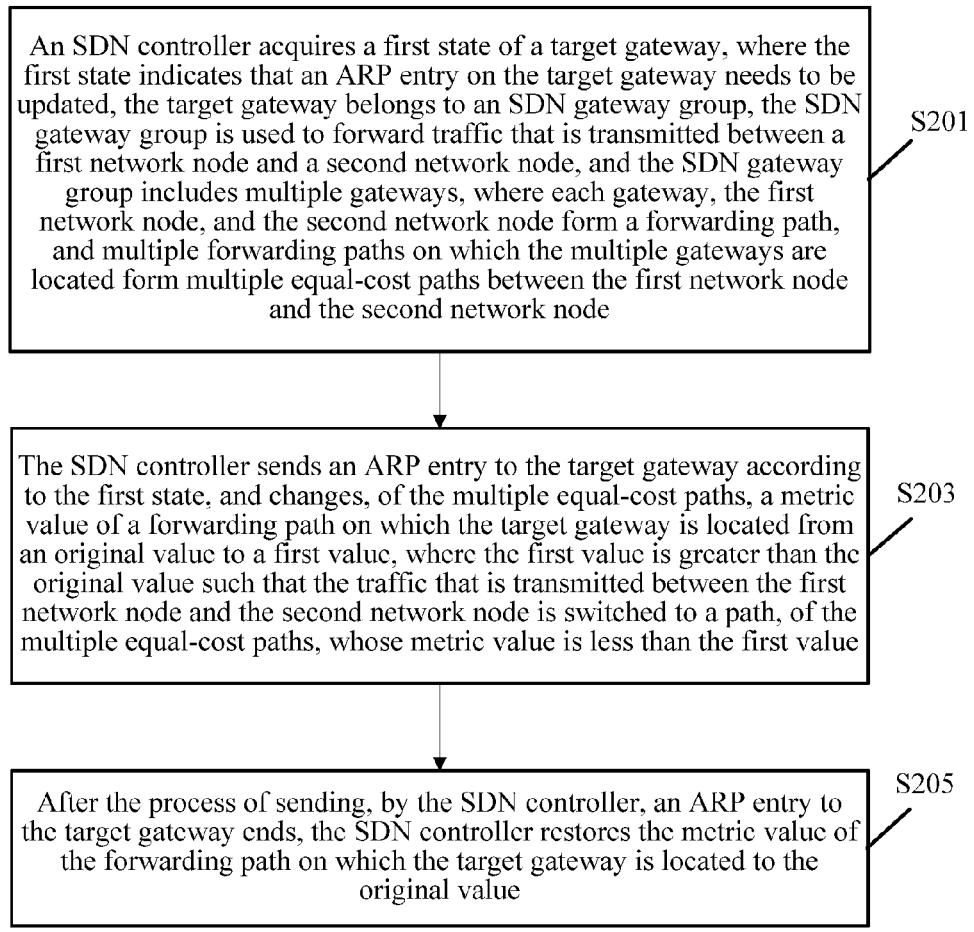
FIG. 4 is a flowchart of a second embodiment of a traffic switching method according to an embodiment of the present disclosure.

Referring to FIG. 4, FIG. 4 is a flowchart of a second embodiment of a traffic switching method according to an embodiment of the present disclosure. According to the embodiment of FIG. 4, after a process of sending an ARP entry to a faulty gateway (that is, the target gateway) is completed, an SDN controller restores a metric value of a forwarding path on which the faulty gateway is located to an original value such that the forwarding path on which the faulty gateway of a multi-active gateway is located is restored to a path of an ECMP, thereby effectively utilizing link bandwidth and reducing network congestion. The method shown in FIG. 4 is an improvement on the method shown in FIG. 2. For content that is not mentioned in the embodiment corresponding to FIG. 4, refer to the description of the embodiment corresponding to FIG. 2. Referring to FIG. 4, the method includes the following steps.

Step S201: An SDN controller acquires a first state of a target gateway, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each gateway, the first network node, and the second network node form a forwarding path, and the multiple forwarding paths on which the multiple gateways are located form multiple equal-cost paths between the first network node and the second network node.

Furthermore, refer to step S101 of the embodiment of FIG. 2, and details are not described herein again.

Step S203: The SDN controller sends an ARP entry to the target gateway according to the first state, and changes, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

Further, refer to step S103 of the embodiment of FIG. 2, and details are not described herein again.

Step S205: After the process of sending, by the SDN controller, an ARP entry to the target gateway ends, the SDN controller restores the metric value of the forwarding path on which the target gateway is located to the original value.

In a specific implementation, the SDN controller may restore the value of the routing metric parameter of the preset routing protocol on the target gateway to the original value using the preset network configuration protocol, such as the XML-based NETCONF or the SNMP in order to trigger the target gateway to publish a correspondence between the routing metric parameter and the original value to the first network node and the second network node using the preset routing protocol such that the first network node and the second network node set, in the their respective routing tables, the metric value of the forwarding path on which the target gateway is located to the original value according to the correspondence between the routing metric parameter and the original value.

Figure 5:
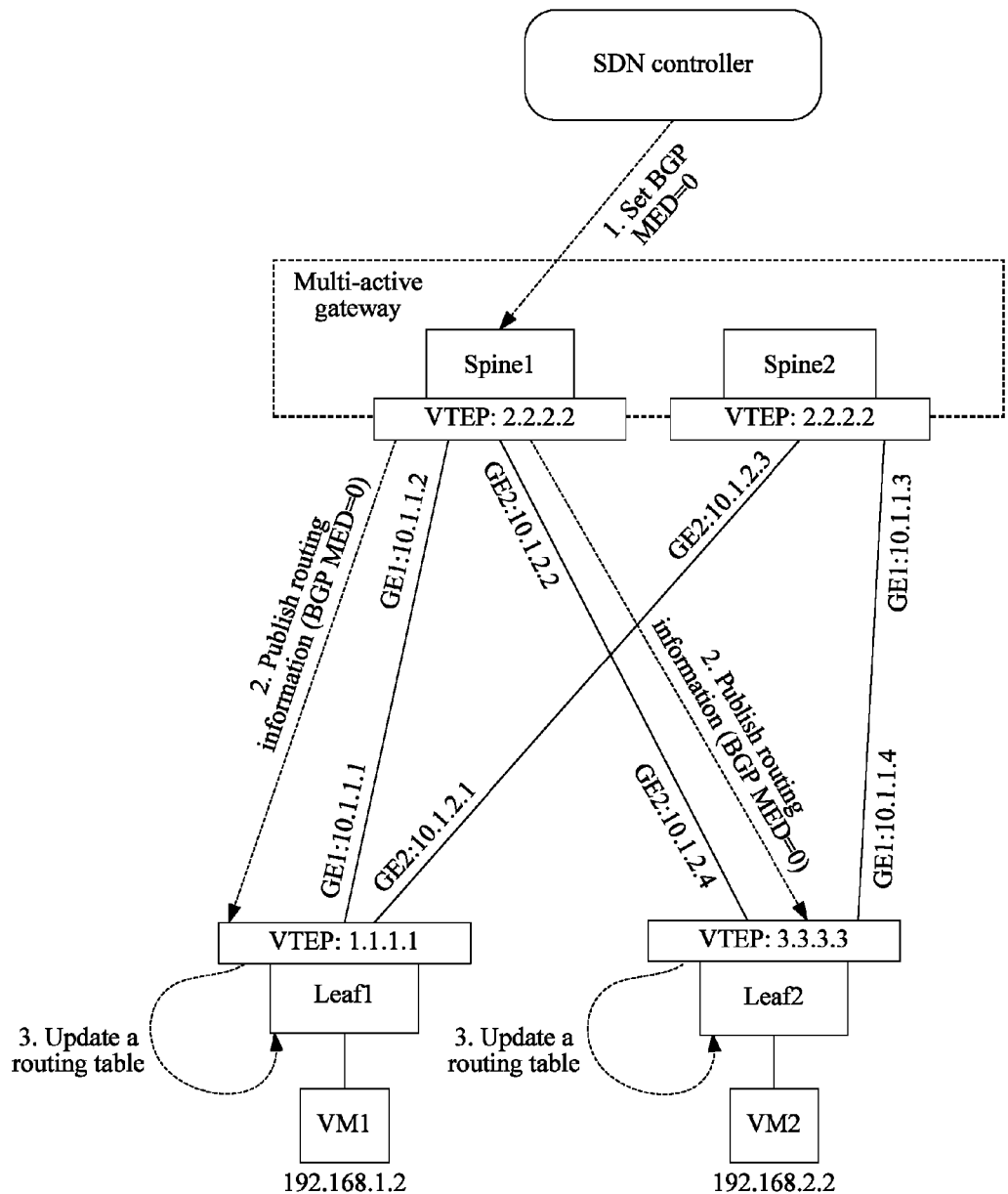
FIG. 5 is a schematic diagram of restoring a metric value of a forwarding path on which a target gateway is located according to an embodiment of the present disclosure.

The following uses the BGP as an example to provide a description with reference to FIG. 5. In this embodiment of the present disclosure, the metric value of the forwarding path on which the target gateway is located may be restored by performing the following steps:

Step 1: An SDN controller restores a value of a routing metric parameter (BGP MED) of the BGP on a target gateway (Spine1) to the original value. For example, the original value may be a minimum metric value of 0.

Step 2: The target gateway publishes a correspondence between the routing metric parameter and the original value (that is, a correspondence between the MED and 0, for example, MED=0 or MED:0) to a first network node (a VTEP of Leaf1) and a second network node (a VTEP of Leaf2) using the BGP.

Step 3: The first network node and the second network node set, in their respective routing tables, a metric value of a forwarding path on which the target gateway is located to the original value according to the correspondence between the routing metric parameter and the original value.

After the foregoing process, a routing table on Leaf1 is shown in Table 3:

TABLE 3

| Destination address | Next hop | Metric value | Outbound interface |
|---|---|---|---|
| 2.2.2.2 | 10.1.1.2 | 0 | GE1 |
| 2.2.2.2 | 10.1.2.3 | 0 | GE2 |
| 3.3.3.3 | 10.1.1.2 | 0 | GE1 |
| 3.3.3.3 | 10.1.2.3 | 0 | GE2 |

It may be known from Table 3 that, a route priority of the forwarding path on which Spine1 (next hop: 10.1.1.2) is located is restored to a high priority, which is the same as a route priority of a forwarding path on which Spine2 (next hop: 10.1.2.3) is located. That is, the forwarding path on which Spine1 is located and the forwarding path on which Spine2 is located are restored to two equal-cost paths between the first network node (the VTEP of Leaf1) and the second network node (the VTEP of Leaf2), thereby effectively utilizing link bandwidth and reducing network congestion.

During implementation of this embodiment of the present disclosure, in the process of sending an ARP entry to the target gateway, the SDN controller sets the metric value of the forwarding path on which the target gateway is located to a high metric value in order to lower a route priority of the forwarding path on which the target gateway is located, thereby avoiding data loss that is caused when traffic is transmitted through the target gateway. After the ARP entry sending is completed, the SDN controller may restore the metric value of the forwarding path on which the target gateway is located such that the forwarding path on which the target gateway is located is restored to a path of the ECMP, thereby effectively utilizing link bandwidth and reducing network congestion.

Figure 6:
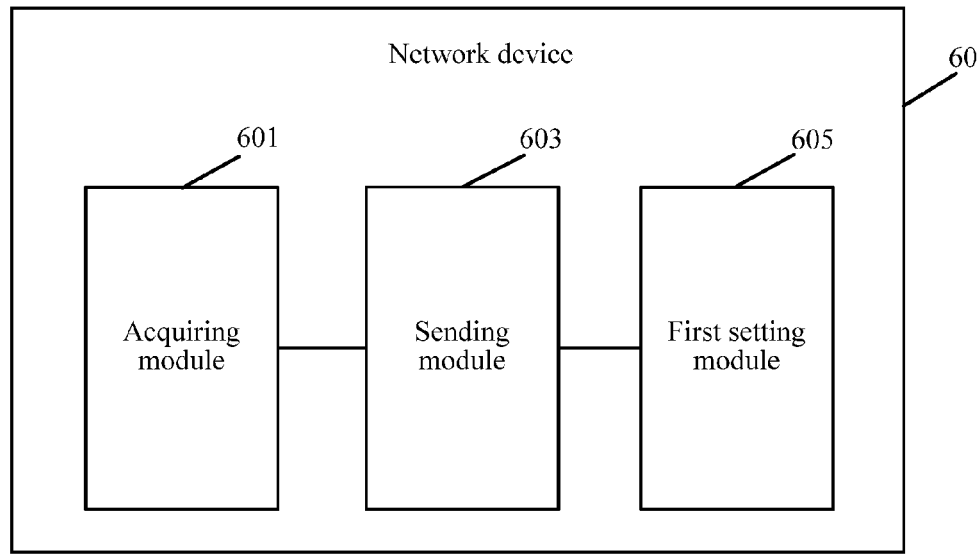
FIG. 6 is a schematic structural diagram of a first embodiment of a network device according to an embodiment of the present disclosure.

Referring to FIG. 6, FIG. 6 is a schematic structural diagram of a first embodiment of a network device according to an embodiment of the present disclosure. A network device 60 shown in FIG. 6 may include an acquiring module 601, a sending module 603, and a first setting module 605. The network device 60 may be configured to perform the method shown in FIG. 2 or FIG. 4. For content that is not mentioned in the embodiment shown in FIG. 6, refer to the description in the embodiment respectively corresponding to FIG. 2 or FIG. 4.

The acquiring module 601 is configured to acquire a first state of a target gateway, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each gateway, the first network node, and the second network node form a forwarding path, and multiple forwarding paths on which the multiple gateways are located form multiple equal-cost paths between the first network node and the second network node.

The sending module 603 is configured to send an ARP entry to the target gateway according to the first state acquired by the acquiring module 601.

The first setting module 605 is configured to change, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

In this embodiment, the SDN gateway group may be equivalent to the multi-active gateway in FIG. 1. The first network node and the second network node may be any two network nodes of neighboring network nodes of the multi-active gateway.

In this embodiment, the first state may be a state in which the target gateway is restarted due to a fault. Generally, restart of a network device results in loss of an ARP entry stored thereon. Therefore, the first state can be used to indicate that an ARP entry on the target gateway needs to be updated. It should be noted that the first state may also be another abnormal state leading to that an ARP entry on the target gateway needs to be updated, which is not limited herein.

In this embodiment, the first state acquired by the acquiring module 601 may be a state sent by the target gateway to the network device 60, or may be a state that is obtained by the acquiring module 601 by active querying (polling). A manner of acquiring the first state by the acquiring module 601 is not limited in this embodiment.

In a specific implementation, in the process of sending an ARP entry to the target gateway by the sending module 603, the first setting module 605 may be further configured to set a value of a routing metric parameter of a preset routing protocol on the target gateway to the first value using a preset network configuration protocol, such as the XML-based NETCONF or the SNMP in order to trigger the target gateway to publish a correspondence between the routing metric parameter and the first value to the first network node and the second network node using the preset routing protocol such that the first network node and the second network node set, in their respective routing tables, the metric value of the forwarding path on which the target gateway is located to the first value according to the correspondence between the routing metric parameter and the first value.

That is, in the process of sending an ARP entry to the target gateway by the sending module 603, the first setting module 605 may set the metric value of the forwarding path on which the target gateway is located to a high metric value such that a route priority of the forwarding path on which the target gateway is located is lowered, thereby avoiding data loss that is caused when traffic is transmitted through the target gateway.

Optionally, the sending module 603 may encapsulate ARP entries into OPENFLOW packets, and then deliver the OPENFLOW packets in batches to the target gateway.

It may be understood that because a network status is dynamic, for example, a network device is added or an IP address of a communications port on a network device is changed, an ARP entry on the network device 60 also needs to be updated dynamically, and the updated ARP entry needs to be sent to the multi-active gateway.

Further, in addition to the acquiring module 601, the sending module 603, and the first setting module 605, the network device 60 may further include an ARP updating module (not shown). The ARP updating module may be configured to receive an ARP request sent by the first network node, where the ARP request is used to request to acquire a MAC address of the second network node, perform ARP learning according to an IP address and a MAC address of the first network node that are carried in the ARP request, search for the MAC address of the second network node according to an IP address of the second network node that is carried in the ARP request, deliver a learned ARP entry to the SDN gateway group to update an ARP entry on the SDN gateway group, and send an ARP response to the first network node according to the MAC address of the second network node, where the ARP response carries the MAC address of the second network node.

It may be understood that the foregoing learned ARP entry may include the IP address and the MAC address of the first network node. The ARP updating module delivers the foregoing learned ARP entry to the multi-active gateway such that the ARP entry on the multi-active gateway is the same as the ARP entry on the network device 60.

Figure 7:
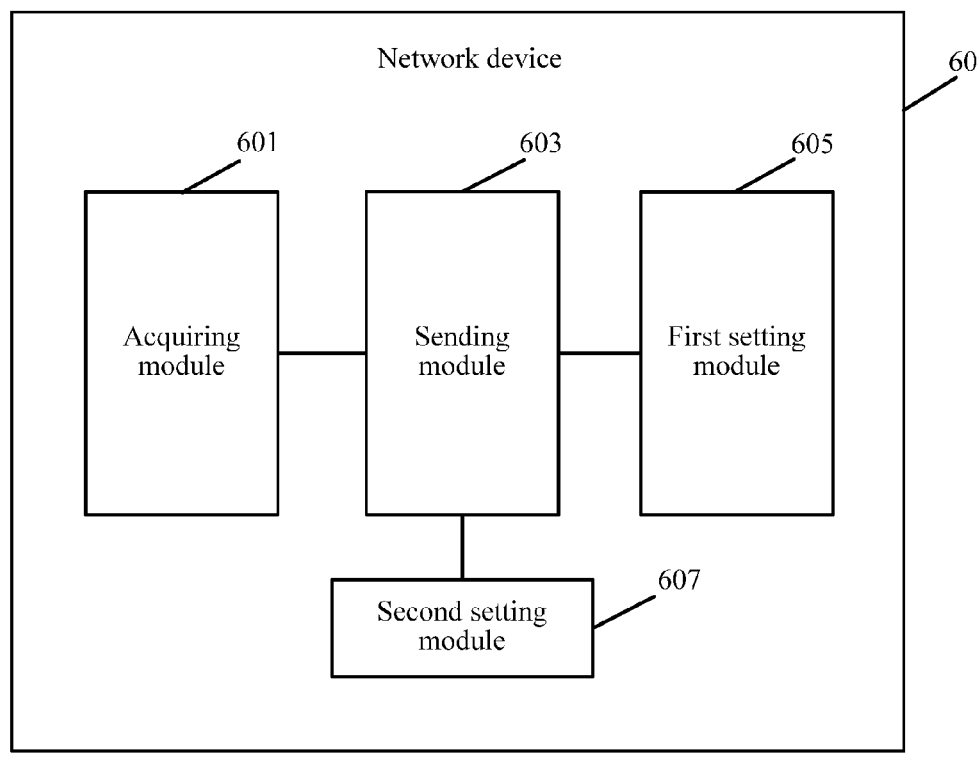
FIG. 7 is a schematic structural diagram of a second embodiment of a network device according to an embodiment of the present disclosure.

As shown in FIG. 7, in addition to the acquiring module 601, the sending module 603, and the first setting module 605, the network device 60 may further include a second setting module 607, where the second setting module 607 is configured to restore the metric value of the forwarding path on which the target gateway is located to the original value after the process of sending an ARP entry to the target gateway by the sending module 603 ends.

In a specific implementation, after the process of sending an ARP entry to the target gateway by the sending module 603 ends, the second setting module 607 may restore the value of the routing metric parameter of the preset routing protocol on the target gateway to the original value using the preset network configuration protocol, such as the XML-based NETCONF or the SNMP in order to trigger the target gateway to publish a correspondence between the routing metric parameter and the original value to the first network node and the second network node using the preset routing protocol such that the first network node and the second network node set, in the their respective routing tables, the metric value of the forwarding path on which the target gateway is located to the original value according to the correspondence between the routing metric parameter and the original value.

That is, after the sending module 603 sends the ARP entry, the second setting module 607 may restore the metric value of the forwarding path on which the target gateway is located such that the forwarding path on which the target gateway is located is restored to a path of the multiple equal-cost paths, thereby effectively utilizing link bandwidth and reducing network congestion.

It may be understood that functions of the functional modules in the network device 60 may be further implemented according to the methods in the method embodiments respectively corresponding to FIG. 2 and FIG. 4, and details are not described herein again.

Figure 8:
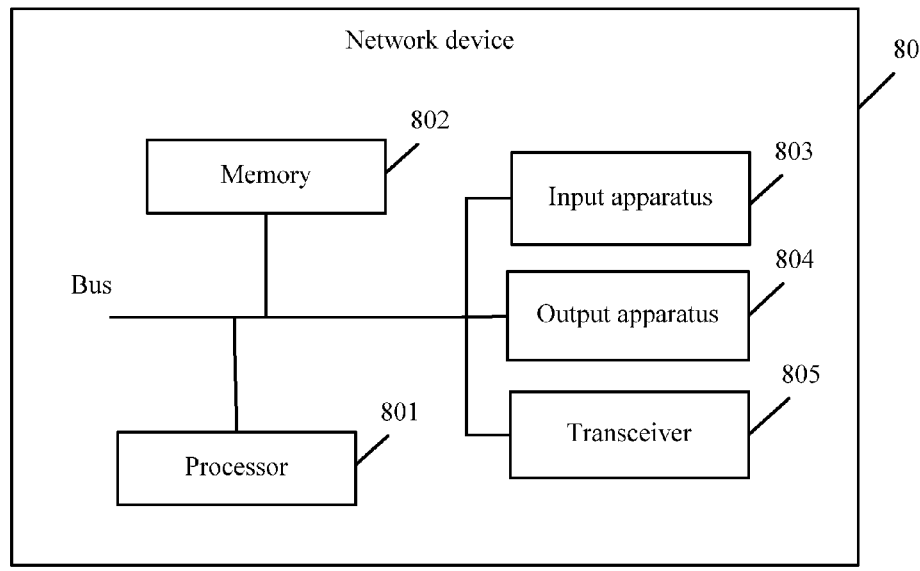
FIG. 8 is a schematic structural diagram of a third embodiment of a network device according to an embodiment of the present disclosure.

Referring to FIG. 8, FIG. 8 is a schematic structural diagram of a third embodiment of a network device according to an embodiment of the present disclosure. Referring to FIG. 8, a network device 80 may include an input apparatus 803, an output apparatus 804, a transceiver 805, a memory 802, and a processor 801 coupled to the memory 802 (there may be one or more processors 801 in the network device 80, and in FIG. 8, one processor is used as an example). In some embodiments of the present disclosure, the input apparatus 803, the output apparatus 804, the transceiver 805, the memory 802, and the processor 801 may be connected using a bus or in another manner, and in FIG. 8, an example in which connection is implemented using a bus is used.

The input apparatus 803 is configured to receive external input data. In a specific implementation, the input apparatus 803 may include a keyboard, a mouse, a photoelectric input apparatus, a sound input apparatus, a touch input apparatus, a scanner, and the like. The output apparatus 804 is configured to output data to the outside. In a specific implementation, the output apparatus 804 may include a display, a loudspeaker, a printer, and the like. The transceiver 805 is configured to send data to another device or receive data from another device. In a specific implementation, the transceiver 805 may include a transceiver component such as a wireless transceiver module or a wired transceiver module. The memory 802 is configured to store a program code. The processor 801 is configured to invoke the program code stored in the memory to perform the following steps: acquiring, by the transceiver 805, a first state of a target gateway, where the first state indicates that an ARP entry on the target gateway needs to be updated, the target gateway belongs to an SDN gateway group, the SDN gateway group is used to forward traffic that is transmitted between a first network node and a second network node, and the SDN gateway group includes multiple gateways, where each gateway, the first network node, and the second network node form a forwarding path, and multiple forwarding paths on which the multiple gateways are located form multiple equal-cost paths between the first network node and the second network node, and sending, by the transceiver 805, an ARP entry to the target gateway according to the first state, and changing, of the multiple equal-cost paths, a metric value of a forwarding path on which the target gateway is located from an original value to a first value, where the first value is greater than the original value such that the traffic that is transmitted between the first network node and the second network node is switched to a path, of the multiple equal-cost paths, whose metric value is less than the first value.

In a specific implementation, in the process of sending an ARP entry to the target gateway, the processor 801 may set a routing metric parameter of a preset routing protocol on the target gateway to the first value using a preset network configuration protocol, such as the XML-based NETCONF or the SNMP in order to trigger the target gateway to publish a correspondence between the routing metric parameter and the first value to the first network node and the second network node using the preset routing protocol such that the first network node and the second network node set, in their respective routing tables, the metric value of the forwarding path on which the target gateway is located to the first value according to the correspondence between the routing metric parameter and the first value.

Optionally, the processor 801 may encapsulate ARP entries into OPENFLOW packets, and then the transceiver 805 delivers the OPENFLOW packets in batches to the target gateway.

In addition, because a network status is dynamic, for example, a network device is added or an IP address of a communications port on the network device is changed, the processor 801 needs to update an ARP entry on the network device 80, and send the updated ARP entry to a multi-active gateway. In a specific implementation, after the VXLAN network shown in FIG. 1 is established, the processor 801 may update an ARP entry on the multi-active gateway using a centralized ARP processing process.

The centralized ARP processing process may include the processor 801 which receives, using the transceiver 805, an ARP request sent by the first network node, where the ARP request is used to request to acquire a MAC address of the second network node. The processor 801 performs ARP learning according to an IP address and a MAC address of the first network node that are carried in the ARP request, and searches for the MAC address of the second network node according to an IP address of the second network node that is carried in the ARP request. Then, the processor 801 delivers a learned ARP entry to the SDN gateway group using the transceiver 805 to update an ARP entry on the SDN gateway group, and sends an ARP response to the first network node according to the MAC address of the second network node using the transceiver 805, where the ARP response carries the MAC address of the second network node.

It may be understood that the foregoing learned ARP entry includes an IP address and a MAC address of a VTEP of Leaf3. The processor 801 delivers the foregoing learned ARP entry to the multi-active gateway such that the ARP entry on the multi-active gateway can be updated. In this way, the ARP entry on the multi-active gateway is the same as the ARP entry on the network device 80.

Further, after the process of sending an ARP entry to a faulty gateway (that is, the target gateway) is completed, the processor 801 may restore the metric value of the forwarding path on which the faulty gateway is located to the original value such that the forwarding path on which the faulty gateway of the multi-active gateway is located is restored to a path of the ECMP, thereby effectively using link bandwidth and reducing network congestion.

In a specific implementation, the processor 801 may restore the value of the routing metric parameter of the preset routing protocol on the target gateway to the original value using the preset network configuration protocol, such as the XML-based NETCONF or the SNMP in order to trigger the target gateway to publish a correspondence between the routing metric parameter and the original value to the first network node and the second network node using the preset routing protocol such that the first network node and the second network node set, in the their respective routing tables, the metric value of the forwarding path on which the target gateway is located to the original value according to the correspondence between the routing metric parameter and the original value.

It may be understood that, for the steps performed by the processor 801, refer to content of the method embodiments respectively corresponding to FIG. 2 and FIG. 4, and details are not described herein again.

Figure 9:
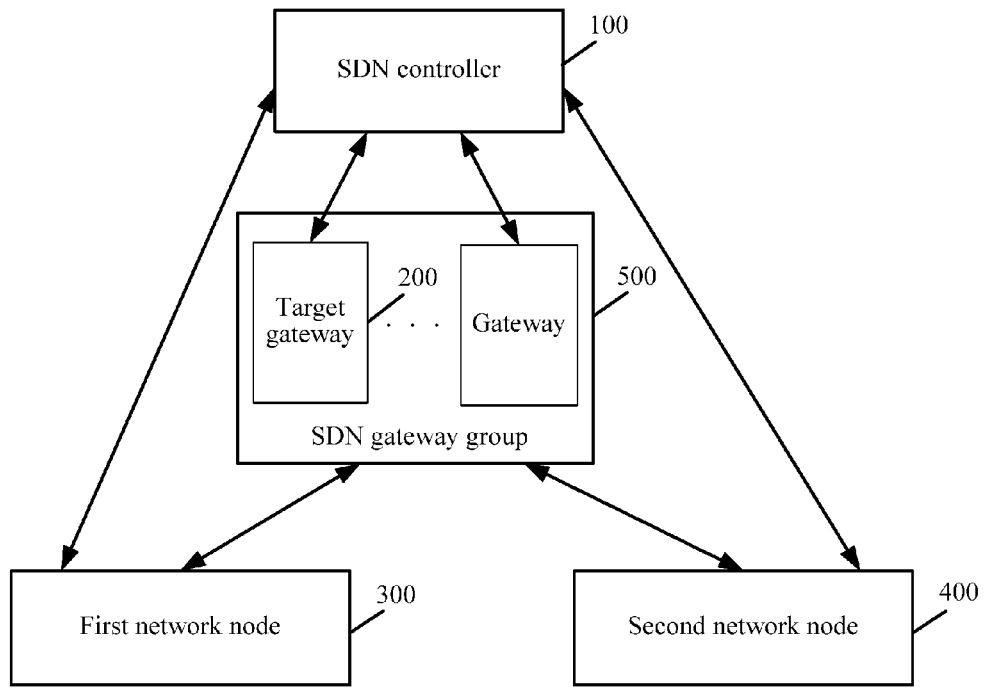
FIG. 9 is a schematic diagram of a network communications system according to an embodiment of the present disclosure.

Referring to FIG. 9, FIG. 9 is a schematic diagram of a network communications system according to an embodiment of the present disclosure. The system shown in FIG. 9 may include an SDN controller 100, a target gateway 200, a first network node 300, a second network node 400, and an SDN gateway group 500, where the SDN controller 100 is configured to acquire a first state of the target gateway 200, where the first state indicates that an ARP entry on the target gateway 200 needs to be updated, the target gateway 200 belongs to the SDN gateway group 500, and the SDN gateway group 500 is used to forward traffic that is transmitted between the first network node 300 and the second network node 400, and the SDN gateway group 500 includes multiple gateways, where each gateway, the first network node 300, and the second network node 400 form a forwarding path, and multiple forwarding paths on which the multiple gateways are located form multiple equal-cost paths between the first network node and the second network node, and the SDN controller 100 is further configured to send an ARP entry to the target gateway 200 according to the first state, and change, of the multiple equal-cost paths, a metric value of a forwarding path on which the target gateway 200 is located from an original value to a first value, where the first value is greater than the original value such that the traffic that is transmitted between the first network node 300 and the second network node 400 is switched to a path, of the multiple equal-cost paths, whose metric value is less than the first value.

Further, the SDN gateway group 500 may be equivalent to the multi-active gateway shown in FIG. 1. The first network node 300 and the second network node 400 may be any two network nodes of neighboring network nodes of the multi-active gateway.

In this embodiment, the first state may be a state in which the target gateway is restarted due to a fault. Generally, restart of a network device results in loss of an ARP entry stored thereon. Therefore, the first state can be used to indicate that an ARP entry on the target gateway 200 needs to be updated. It should be noted that the first state may also be another abnormal state leading to that an ARP entry on the target gateway 200 needs to be updated, which is not limited herein.

In a specific implementation, in the process of sending an ARP entry to the target gateway 200, the SDN controller 100 may set a routing metric parameter of a preset routing protocol on the target gateway 200 to the first value using a preset network configuration protocol, such as the XML-based NETCONF or the SNMP in order to trigger the target gateway 200 to publish a correspondence between the routing metric parameter and the first value to the first network node 300 and the second network node 400 using the preset routing protocol such that the first network node 300 and the second network node 400 set, in their respective routing tables, the metric value of the forwarding path on which the target gateway 200 is located to the first value according to the correspondence between the routing metric parameter and the first value.

Optionally, the SDN controller 100 may encapsulate ARP entries into OPENFLOW packets, and then deliver the OPENFLOW packets in batches to the target gateway 200.

That is, in the process of sending an ARP entry to the target gateway 200, the SDN controller 100 may set the metric value of the forwarding path on which the target gateway 200 is located to a high metric value such that a route priority of the forwarding path on which the target gateway 200 is located is lowered, thereby avoiding data loss that is caused when traffic is transmitted through the target gateway 200.

Further, the SDN controller restores the metric value of the forwarding path on which the target gateway is located to the original value after sending, by the SDN controller, an ARP entry to the target gateway.

In a specific implementation, the SDN controller may restore a value of the routing metric parameter of the preset routing protocol on the target gateway to the original value using the preset network configuration protocol, such as the XML-based NETCONF or the SNMP in order to trigger the target gateway to publish a correspondence between the routing metric parameter and the original value to the first network node and the second network node using the preset routing protocol such that the first network node and the second network node set, in the their respective routing tables, the metric value of the forwarding path on which the target gateway is located to the original value according to the correspondence between the routing metric parameter and the original value.

That is, after the ARP entry sending is completed, the SDN controller 100 may restore the metric value of the forwarding path on which the target gateway 200 is located such that the forwarding path on which the target gateway is located is restored to a path of the multiple equal-cost paths, thereby effectively utilizing link bandwidth and reducing network congestion.

In an actual application, because a network status is dynamic, for example, a network device is added or an IP address of a communications port on a network device is changed, an ARP entry on the SDN controller 100 also needs to be updated dynamically, and the updated ARP entry needs to be sent to the SDN gateway group 500. In a specific implementation, after the VXLAN network shown in FIG. 1 is established, the SDN controller 100 may update an ARP entry on the SDN gateway group 500 using a centralized ARP processing process.

In a specific implementation, the SDN controller 100 may update an ARP entry on the SDN gateway group 500 using a centralized ARP processing process. Further, the centralized ARP processing process may mainly include the following steps.

Step 1: The SDN controller 100 receives an ARP request sent by the first network node 300, where the ARP request is used to request to acquire a MAC address of the second network node 400.

Step 2: The SDN controller 100 performs ARP learning according to an IP address and a MAC address of the first network node 300 that are carried in the ARP request, and searches for the MAC address of the second network node 400 according to an IP address of the second network node 400 that is carried in the ARP request.

Step 3: The SDN controller 100 delivers a learned ARP entry to the SDN gateway group 500 to update an ARP entry on the SDN gateway group 500, and sends an ARP response to the first network node 300 according to the MAC address of the second network node 400, where the ARP response carries the MAC address of the second network node 400.

It may be understood that the SDN controller 100 delivers a learned new ARP entry to the SDN gateway group 500 such that an ARP entry on the SDN gateway group 500 can be updated to be the same as the ARP entry on the SDN controller 100.

It should be noted that, for content that is not mentioned in the embodiment shown in FIG. 9, refer to the description of the embodiment respectively corresponding to FIG. 2 or FIG. 4, and details are not described herein again.

It may be understood that the SDN controller 100 may also be the network device 60 described in the embodiments of FIG. 6 and FIG. 7 or the network device 80 described in the embodiment of FIG. 8, and details are not described herein again.

Based on the above, during implementation of this embodiment of the present disclosure, after acquiring a first state of a faulty gateway (the target gateway) of the multi-active gateway, the SDN controller sends an ARP entry to the faulty gateway, and changes, in the process of sending the ARP entry, a metric value of a forwarding path on which the faulty gateway is located from an original value to a first value, where the first value is greater than the original value such that a route priority of the forwarding path on which the faulty gateway is located is lowered, thereby preventing traffic from being routed to the faulty gateway through an ECMP that is formed by the multi-active gateway in order to avoid data loss. In addition, in the process of sending the ARP entry, other service functions of the faulty gateway are not affected.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), a random access memory (RAM), or the like.

What is disclosed above is merely some embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A traffic switching method, comprising:
acquiring, by a software-defined networking (SDN) controller, a first state of a target gateway, wherein the first state indicates that an Address Resolution Protocol (ARP) entry on the target gateway needs to be updated, wherein the target gateway belongs to an SDN gateway group, wherein the SDN gateway group is used to forward traffic that is transmitted between a first network node and a second network node, wherein the SDN gateway group comprises multiple gateways, wherein each of the multiple gateways, the first network node, and the second network node form a forwarding path, and wherein multiple forwarding paths on which the multiple gateways are located form multiple equal-cost paths between the first network node and the second network node;
sending, by the SDN controller, the ARP entry to the target gateway according to the first state; and
changing, by the SDN controller, of the multiple equal-cost paths, a metric value of the forwarding path on which the target gateway is located from an original value to a first value, wherein the first value is greater than the original value such that the traffic that is transmitted between the first network node and the second network node is switched to a path, of the multiple equal-cost paths, whose metric value is less than the first value.

2. The method according to claim 1, wherein changing, of the multiple equal-cost paths, the metric value of the forwarding path on which the target gateway is located from the original value to the first value comprises setting, by the SDN controller, a value of a routing metric parameter of a preset routing protocol on the target gateway to the first value using a preset network configuration protocol in order to trigger the target gateway to publish a first correspondence between the routing metric parameter and the first value to the first network node and the second network node using the preset routing protocol such that the first network node and the second network node set, in their respective routing tables, the metric value of the forwarding path on which the target gateway is located to the first value according to the first correspondence between the routing metric parameter and the first value.

3. The method according to claim 2, further comprising restoring, by the SDN controller, the metric value of the forwarding path on which the target gateway is located to the original value after sending the ARP entry to the target gateway.

4. The method according to claim 3, wherein restoring, by the SDN controller, the metric value of the forwarding path on which the target gateway is located to the original value comprises restoring, by the SDN controller, the value of the routing metric parameter of the preset routing protocol on the target gateway to the original value using the preset network configuration protocol in order to trigger the target gateway to publish a second correspondence between the routing metric parameter and the original value to the first network node and the second network node using the preset routing protocol such that the first network node and the second network node set, in the their respective routing tables, the metric value of the forwarding path on which the target gateway is located to the original value according to the second correspondence between the routing metric parameter and the original value.

5. The method according to claim 4, further comprising:
receiving, by the SDN controller, an ARP request sent by the first network node, wherein the ARP request is used to request to acquire a media access control (MAC) address of the second network node;
performing, by the SDN controller, ARP learning according to an Internet Protocol (IP) address and a MAC address of the first network node that are carried in the ARP request;
searching, by the SDN controller, for the MAC address of the second network node according to an IP address of the second network node that is carried in the ARP request;

delivering, by the SDN controller, a learned ARP entry to the SDN gateway group to update the ARP entry on the SDN gateway group; and sending an ARP response to the first network node according to the MAC address of the second network node, wherein the ARP response carries the MAC address of the second network node.

6. A network device, comprising:
a memory;
a transceiver; and
a processor,
wherein the memory, the transceiver and the processor are coupled to each other,
wherein the memory is configured to store a program code,
wherein the processor is configured to call the program code to implement a traffic switching method, and wherein the traffic switching method comprises:
   acquiring a first state of a target gateway using the transceiver, wherein the first state indicates that an Address Resolution Protocol (ARP) entry on the target gateway needs to be updated, wherein the target gateway belongs to a software-defined networking (SDN) gateway group, wherein the SDN gateway group is used to forward traffic that is transmitted between a first network node and a second network node, wherein the SDN gateway group comprises multiple gateways, wherein each of the multiple gateways, the first network node, and the second network node form a forwarding path, and wherein multiple forwarding paths on which the multiple gateways are located form multiple equal-cost paths between the first network node and the second network node;
   sending the ARP entry to the target gateway according to the first state using the transceiver; and
   changing, of the multiple equal-cost paths, a metric value of the forwarding path on which the target gateway is located from an original value to a first value, wherein the first value is greater than the original value such that the traffic that is transmitted between the first network node and the second network node is switched to a path, of the multiple equal-cost paths, whose metric value is less than the first value.

7. The device according to claim 6, wherein changing, of the multiple equal-cost paths, the metric value of the forwarding path on which the target gateway is located from the original value to the first value comprises setting a value of a routing metric parameter of a preset routing protocol on the target gateway to the first value using a preset network configuration protocol in order to trigger the target gateway to publish a first correspondence between the routing metric parameter and the first value to the first network node and the second network node using the preset routing protocol such that the first network node and the second network node set, in their respective routing tables, the metric value of the forwarding path on which the target gateway is located to the first value according to the first correspondence between the routing metric parameter and the first value.

8. The device according to claim 7, further comprising restoring the metric value of the forwarding path on which the target gateway is located to the original value after sending the ARP entry to the target gateway.

9. The device according to claim 8, wherein restoring the metric value of the forwarding path on which the target gateway is located to the original value comprises restoring the value of the routing metric parameter of the preset routing protocol on the target gateway to the original value using the preset network configuration protocol in order to trigger the target gateway to publish a second correspondence between the routing metric parameter and the original value to the first network node and the second network node using the preset routing protocol such that the first network node and the second network node set, in their respective routing tables, the metric value of the forwarding path on which the target gateway is located to the original value according to the second correspondence between the routing metric parameter and the original value.

10. The device according to claim 9, further comprising:
   receiving an ARP request sent by the first network node, wherein the ARP request is used to request to acquire a media access control (MAC) address of the second network node;
   performing ARP learning according to an Internet Protocol (IP) address and a MAC address of the first network node that are carried in the ARP request;
   searching for the MAC address of the second network node according to an IP address of the second network node that is carried in the ARP request;
   delivering a learned ARP entry to the SDN gateway group to update the ARP entry on the SDN gateway group; and
   sending an ARP response to the first network node according to the MAC address of the second network node, wherein the ARP response carries the MAC address of the second network node.

11. A network communications system, comprising:
a software-defined networking (SDN) controller;
a target gateway;
an SDN gateway group;
a first network node; and
a second network node,
wherein the target gateway, the SDN gateway group, the first network node and the second network node are in communication with the SDN controller,
wherein the SDN controller is configured to:
   acquire a first state of the target gateway, wherein the first state indicates that an Address Resolution Protocol (ARP) entry on the target gateway needs to be updated, wherein the target gateway belongs to the SDN gateway group, wherein the SDN gateway group is used to forward traffic that is transmitted between the first network node and the second network node, wherein the SDN gateway group comprises multiple gateways, wherein each of the multiple gateways, the first network node, and the second network node form a forwarding path, and wherein multiple forwarding paths on which the multiple gateways are located form multiple equal-cost paths between the first network node and the second network node;
   send the ARP entry to the target gateway according to the first state; and
   change, of the multiple equal-cost paths, a metric value of the forwarding path on which the target gateway is located from an original value to a first value, wherein the first value is greater than the original value such that the traffic that is transmitted between the first network node and the second network node is switched to a path, of the multiple equal-cost paths, whose metric value is less than the first value.

12. The system according to claim 11, wherein changing, of the multiple equal-cost paths, the metric value of the forwarding path on which the target gateway is located from the original value to the first value, the SDN controller is further configured to set a value of a routing metric parameter of a preset routing protocol on the target gateway to the first value using a preset network configuration protocol in order to trigger the target gateway to publish a first correspondence between the routing metric parameter and the first value to the first network node and the second network node using the preset routing protocol such that the first network node and the second network node set, in their respective routing tables, the metric value of the forwarding path on which the target gateway is located to the first value according to the first correspondence between the routing metric parameter and the first value.

13. The system according to claim 12, wherein the SDN controller is further configured to restore the metric value of the forwarding path on which the target gateway is located to the original value after sending the ARP entry to the target gateway.

14. The system according to claim 13, wherein restoring the metric value of the forwarding path on which the target gateway is located to the original value, the SDN controller is further configured to restore the value of the routing metric parameter of the preset routing protocol on the target gateway to the original value using the preset network configuration protocol in order to trigger the target gateway to publish a second correspondence between the routing metric parameter and the original value to the first network node and the second network node using the preset routing protocol such that the first network node and the second network node set, in their respective routing tables, the metric value of the forwarding path on which the target gateway is located to the original value according to the second correspondence between the routing metric parameter and the original value.

15. The method according to claim 14, wherein the SDN controller is further configured to:
  receive an ARP request sent by the first network node, wherein the ARP request is used to request to acquire a media access control (MAC) address of the second network node;
  perform ARP learning according to an Internet Protocol (IP) address and a MAC address of the first network node that are carried in the ARP request;
  search for the MAC address of the second network node according to an IP address of the second network node that is carried in the ARP request;
  deliver a learned ARP entry to the SDN gateway group to update the ARP entry on the SDN gateway group; and
  send an ARP response to the first network node according to the MAC address of the second network node, wherein the ARP response carries the MAC address of the second network node.

* * * * *

UNITED STATES PATENT AND TRADEMARK OFFICE
CERTIFICATE OF CORRECTION

PATENT NO. : 9,887,902 B2  
APPLICATION NO. : 15/216479  
DATED : February 6, 2018  
INVENTOR(S) : Ziyang Yao and Feng Dong It is certified that error appears in the above-identified patent and that said Letters Patent is hereby corrected as shown below:

On the Title Page

(73) Assignee should read:
HUAWEI TECHNOLOGIES CO., LTD., SHENZHEN (CN)

Signed and Sealed this
Twenty-seventh Day of March, 2018

Andrei Iancu
*Director of the United States Patent and Trademark Office*